United States Patent [19]

Morgan

[11] Patent Number: 5,313,881
[45] Date of Patent: May 24, 1994

[54] COMPACT DISC MARKING APPARATUS

[76] Inventor: William T. Morgan, 136 Woodland Dr., Lansdale, Pa. 19446

[21] Appl. No.: 1,254

[22] Filed: Jan. 6, 1993

[51] Int. Cl.⁵ .............................................. B41F 19/02
[52] U.S. Cl. ........................................... 101/4; 101/28
[58] Field of Search ....................... 101/3.1, 4, 18, 26, 101/28, 30, 31.1, 41, DIG. 40; 400/122, 127

[56] References Cited

U.S. PATENT DOCUMENTS

| | | | |
|---|---|---|---|
| 427,501 | 5/1890 | Chappatte | 101/4 |
| 553,132 | 1/1896 | Park | 101/31.1 |
| 1,605,869 | 11/1926 | Swartz | 101/31.1 |
| 2,208,050 | 7/1940 | Pasinski | 101/93.36 |
| 3,199,650 | 8/1965 | Brown et al. | 101/93.19 |
| 3,774,744 | 11/1973 | Corte | 400/134.4 |
| 4,086,851 | 5/1978 | Brandell | 101/4 |
| 4,109,572 | 8/1978 | Roulleau | 101/37 |
| 4,834,843 | 5/1989 | Koop et al. | 204/5 |

Primary Examiner—Edgar S. Burr
Assistant Examiner—Stephen R. Funk
Attorney, Agent, or Firm—Woodcock Washburn Kurtz Mackiewicz & Norris

[57] ABSTRACT

A compact disc marking apparatus 10 comprising a top portion 12, a bottom portion 14 attached with a pivot or shaft 16 to the top portion 12, and a locking handle 18. A recess 12-2 receives the handle 18 when it is vertically rotated to a lowered position, when marking a disc. The bottom portion 14 comprises a first recess 14-1 and a second recess 14-2. The locking handle 18 comprises a lever member 18-1, an engaging/compression member 18-2, a flanged engaging member 18-3 (FIG. 2), a pivot 18-4 (FIG. 6), a flanged portion 18-5, and a rounded portion 18-6 (FIG. 9).

14 Claims, 5 Drawing Sheets

COMPACT DISC MARKING APPARATUS

FIELD OF THE INVENTION

The present invention relates generally to the fields of marking apparatus and compact discs, and relates more particularly to apparatus for applying identifying markings on laser discs (e.g., compact discs) and like record media.

BACKGROUND OF THE INVENTION

Since its introduction, the compact disc (CD) format has been widely accepted. There are currently many disc formats available, including CD-single, CD-video, CD-interactive, and CD-ROM, and it is expected that other CD formats to be introduced will allow the disc to be written to as well as read from, such that a user would be able to record and play back digital music and/or computer data. However, due to their small size and ease of liquidation by thieves, compact discs have become attractive targets for theft. Therefore, many CD owners perceive a need to apply identifying markings on their CDs. Such markings are typically applied with an ink marker (e.g., a felt marker) or a tacky label. However, ink is known to damage the disc and tacky labels can be removed.

Additionally, due to their great storage capacity and long life, compact discs are being employed by libraries, universities, and like institutions (even the U.S. Patent and Trademark Office) for storing computer data. Such institutions also have a need to apply markings (e.g., serial numbers) to their CDs.

The present invention represents an improvement of the apparatus disclosed in the present inventor's own U.S. patent application Ser. No. 292,318, filed Dec. 30, 1988, now abandoned. The apparatus disclosed in the abandoned application was too difficult to use and was therefore unacceptable. This led to the application's and the apparatus' abandonment, and presented the present inventor the task of devising a new marking apparatus.

SUMMARY OF THE INVENTION

Accordingly, the primary goal of the present invention is to provide easy to use marking apparatus for applying permanent identifying markings to laser discs and like record media. Of course, such markings should not affect the usability of information stored on the disk.

Compact disc marking apparatus in accordance with the present invention include: a top portion (12); a bottom portion (14) comprising a top surface for receiving a compact disc, a die receiving recess (14-3) formed in the top surface for receiving a die (20) bearing identifying marks, a through-hole (14-5) coaxially aligned with the die receiving recess, a bottom surface opposite the top surface, and a recess (14-6) formed in the bottom surface coaxially aligned with the through-hole; a pivot (16) coupling the bottom portion to the top portion; and a locking handle (18) coupled to the top portion so as to be in axial alignment with the through-hole when the apparatus is in a closed condition, the locking handle comprising a lever member (18-1) and an engaging-/compression member (18-2) for engaging the bottom portion and applying a compression force to compress the disc against the die to cause the identifying marks to be formed in the compact disc.

In preferred embodiments of the present invention, the engaging/compression member comprises a flanged engaging member (18-3) and the locking handle further comprises means for horizontally-pivotally attaching the locking handle to the top portion such that the flanged engaging member engages the recess formed in the bottom surface when the locking handle is rotated to a locked position and disengages the recess formed in the bottom surface when the locking handle is rotated to an unlocked position. The term horizontally-pivotally, as used herein to describe a way of attaching the locking handle to the top portion, means that the locking handle is free to rotate about an axis perpendicular to the top portion, as shown in FIG. 1.

In preferred embodiments of the invention, the locked and unlocked positions of the locking handle are approximately 90° apart.

The lever member in preferred embodiments comprises a partially rounded end (18-6) vertically-pivotally coupled to the engaging/compression member such that the compression force is provided to compress the disc against the die when the lever member is in a lowered position and the compression force is removed when the lever member is in a raised position. The term vertically-pivotally, as used herein to describe a way of attaching the lever member to the engaging/compression member, means that the lever member is free to rotate about an axis parallel to the to the top portion, as shown in FIG. 1.

In preferred embodiments, the bottom portion comprises first and second recesses (14-1, 14-2) formed on opposite sides of the bottom portion. These recesses allow a user to grasp the compact disc at the recesses to seat and unseat the compact disc. The present invention also encompasses compact disc marking apparatus comprising: a top portion; a die (20) bearing identifying marks or raised characters, the characters having a stroke width of approximately 0.003 in. to 0.005 in. and a height of approximately 0.007 in. to 0.009 in.; a bottom portion pivotally coupled to the top portion, the bottom portion comprising a top surface for receiving a compact disc, a die receiving recess formed in the top surface for receiving the die, a through-hole coaxially aligned with the die receiving recess, a bottom surface opposite the top surface, and a recess formed in the bottom surface coaxially aligned with the through-hole; and a locking handle coupled to the top portion so as to be in axial alignment with the through-hole when the apparatus is in a closed condition. The locking handle comprises a lever member and an engaging/compression member for engaging the bottom portion and applying a compression force to compress the disc against the die to cause the identifying marks to be formed in the compact disc.

Other features of the present invention are described below.

DETAILED DESCRIPTION OF PREFERRED EMBODIMENT

Figure 1:
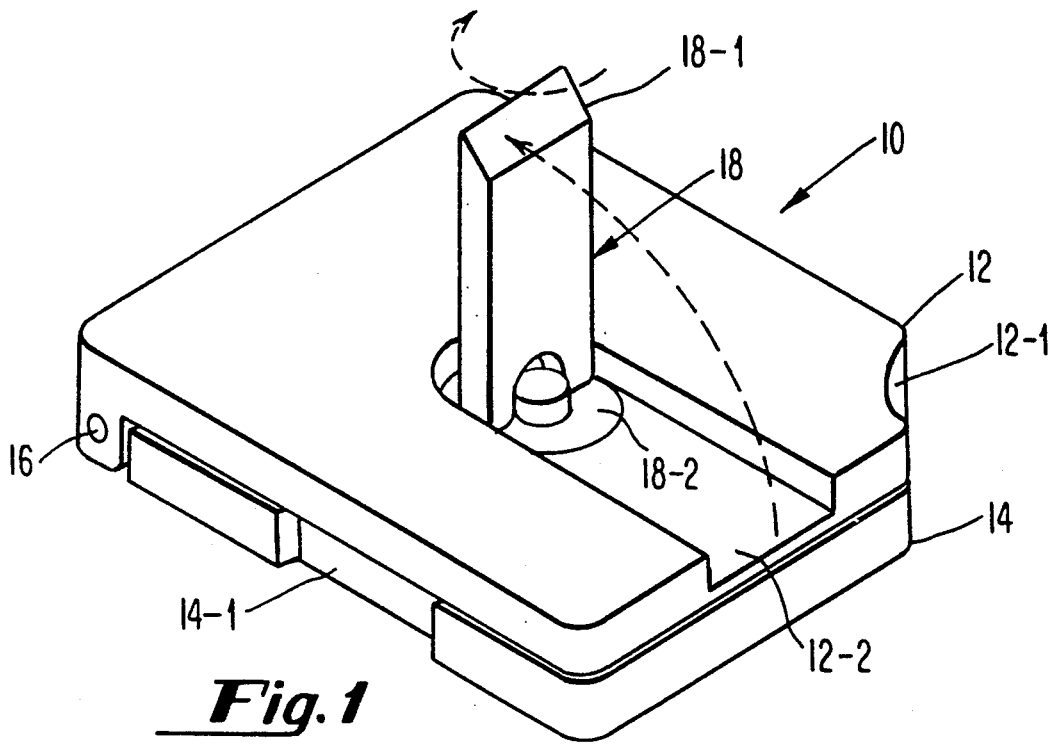
FIG. 1 depicts one preferred embodiment of a marking apparatus in accordance with the present invention. The apparatus is shown in a closed condition.

FIG. 1 depicts one preferred embodiment of a compact disc marking apparatus 10 in accordance with the present invention. This apparatus comprises a top portion 12, a bottom portion 14 attached with a pivot or shaft 16 to the top portion 12, and a locking handle 18. The top portion 12 comprises a corner indentation 12-1 and a recess 12-2. The corner indentation 12-1 makes the apparatus easy to handle when marking a disc, and the recess 12-2 receives the handle 18 when it is vertically rotated to a lowered position, e.g., when marking a disc.

Figure 2:
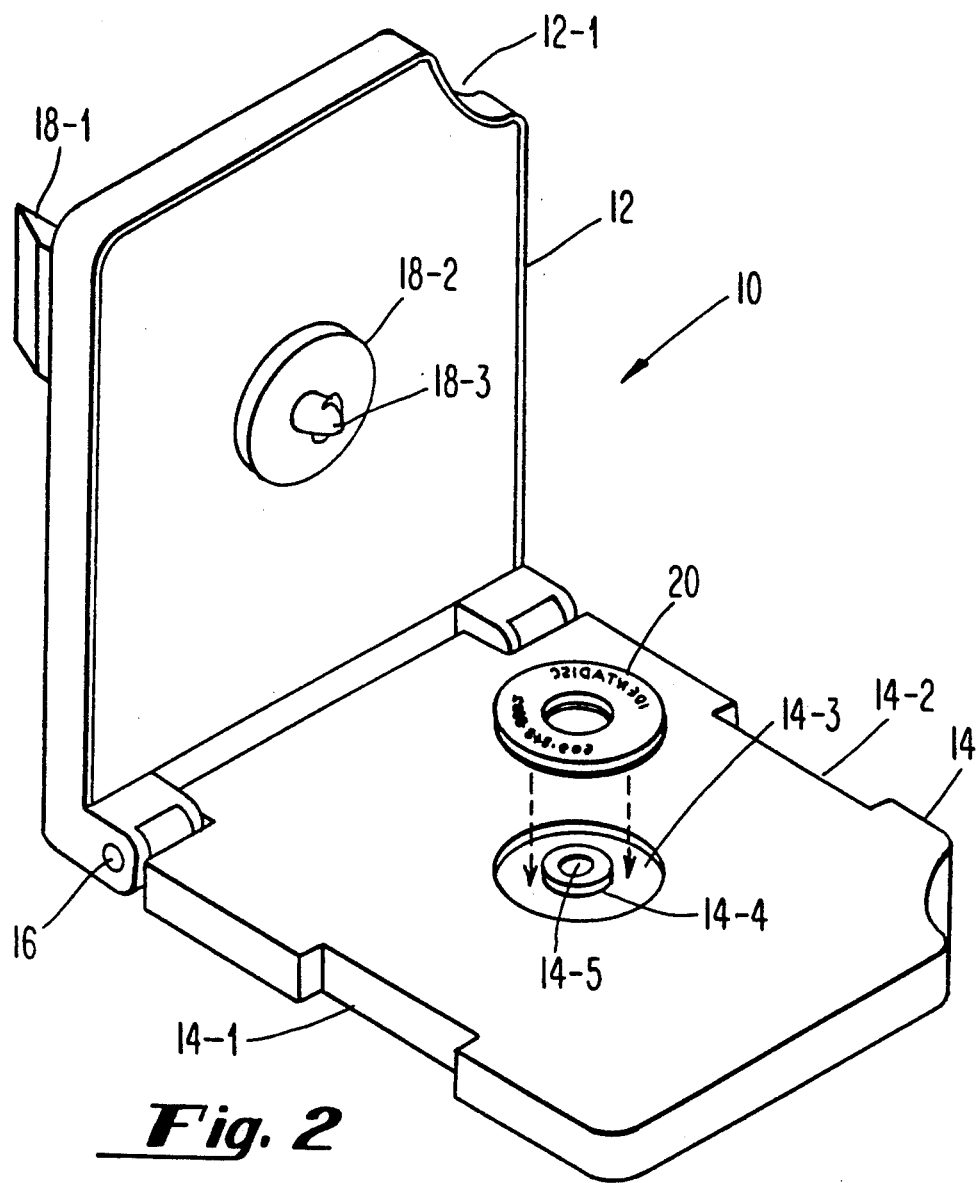
FIG. 2 depicts the marking apparatus of FIG. 1 in an opened condition.

The bottom portion 14 comprises a first recess 14-1 and a second recess 14-2, the second recess 14-2 being shown in FIG. 2.

Figure 8:
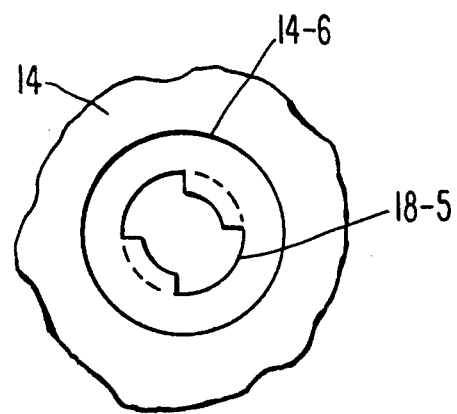
FIG. 8 depicts a partial view of the marking apparatus as viewed from the line 8—8 of FIG. 6.
Figure 9:
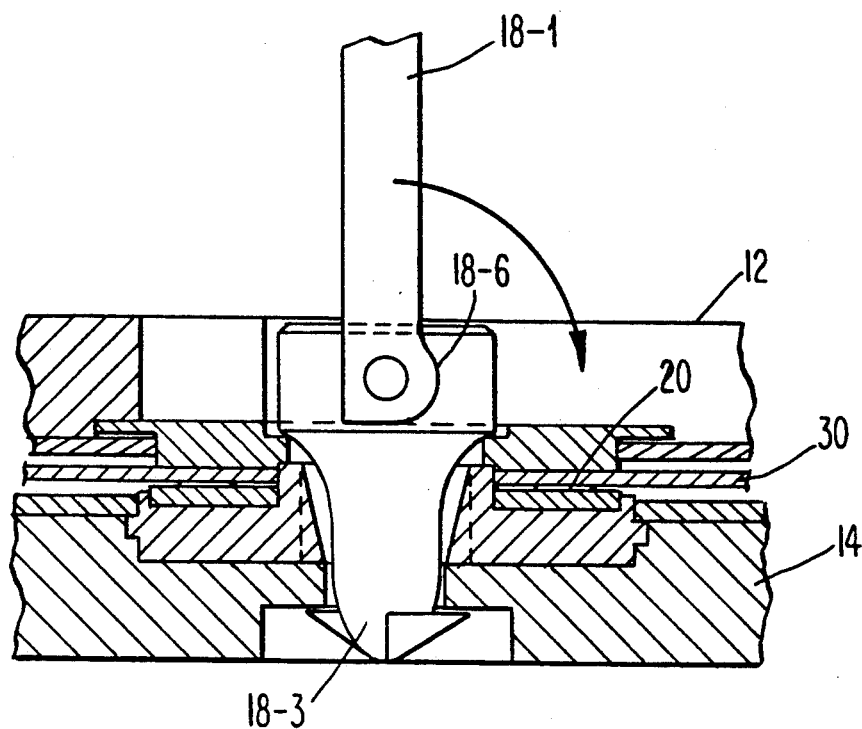
FIG. 9 depicts a cross-section of the marking apparatus with the flanged member 18-3 engaged and the locking handle 18 rotated 90°.

The locking handle 18 comprises a lever member 18-1, an engaging/compression member 18-2, a flanged engaging member 18-3 (FIG. 2), a pivot or shaft 18-4 (FIG. 6), a flanged portion 18-5 (FIG. 6), and a rounded portion 18-6 (FIG. 9). Further details of the structure of the marking apparatus and its method of operation are described below with reference to FIGS. 2 through 9.

Figure 6:
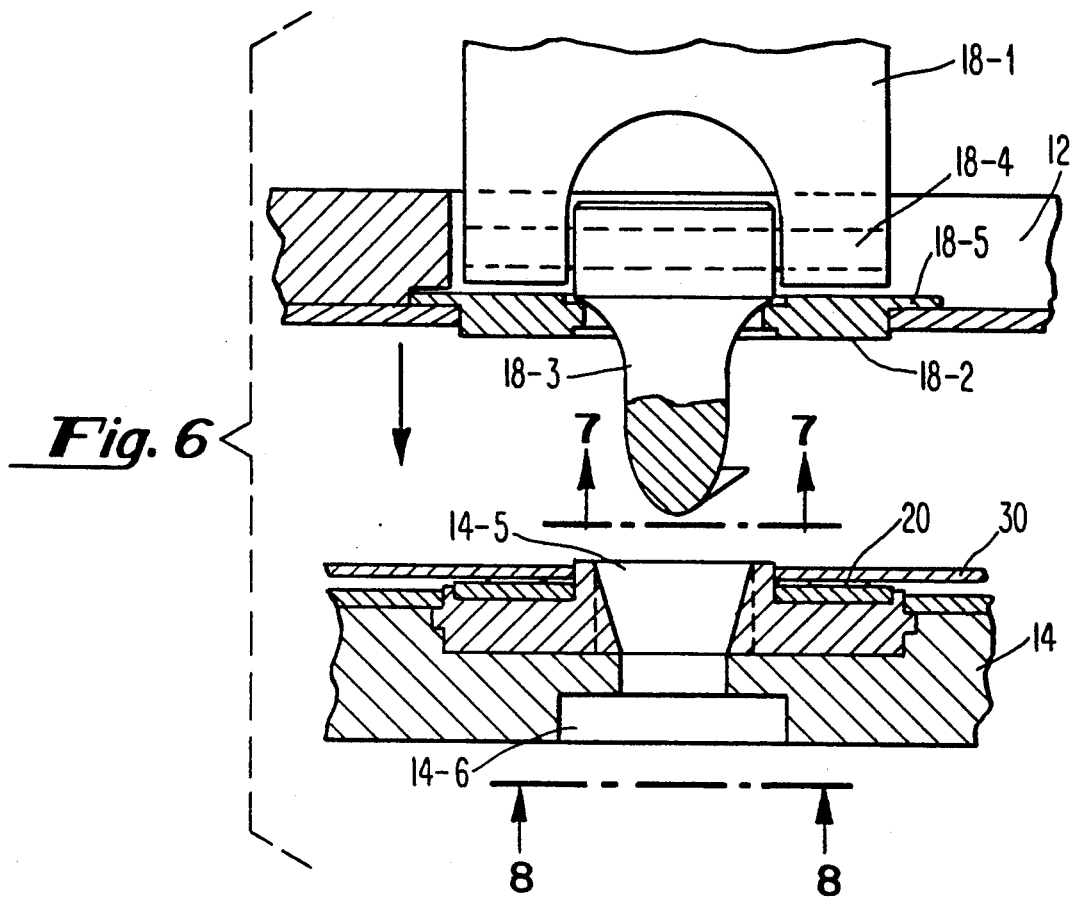
FIG. 6 depicts a cross-section of the marking apparatus, including the compact disc and die.

Referring now to FIG. 2, the apparatus is opened by rotating the lever member 18-1 such that the flanged engaging member 18-3 is disengaged from the bottom portion 14, and the top portion 12 is pivoted about the pivot or shaft 16 away from the bottom portion 14. As can be seen with the apparatus in its opened condition, the bottom portion 14 comprises a die receiving recess 14-3, a die aligning member 14-4, a through-hole 14-5, and a recess 14-6 in its bottom surface (recess 14-6 is shown in FIG. 6). As shown in FIG. 2, a die 20 bearing identifying markings is inserted into the die receiving recess 14-3.

Figure 2A:
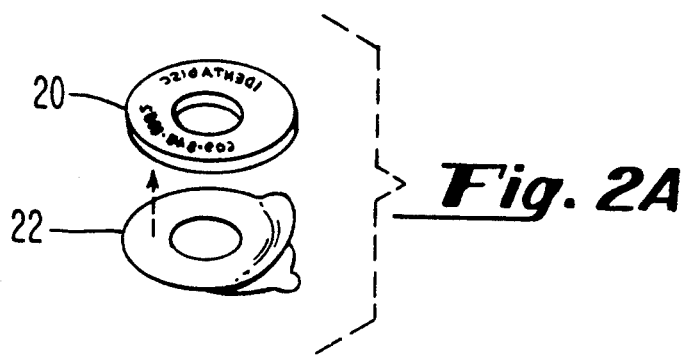
FIG. 2A depicts a die bearing identifying markings.

Referring to FIG. 2A, the die 20 carries raised lettering, which the marking apparatus impresses into the compact disc as described herein. Preferably, a compressive force of approximately 350 lbs. per square inch is provided to permanently form the markings in the disc 30. In addition, preferred embodiments of the invention include a tacky member 22 (e.g., PSA tape) that holds the die in place.

The characters on the die are preferably etched using a chemical machining process. The die is etched on one side only. The character stroke width and height are critical. Preferably, the stroke width should be maintained within a 0.003 in. to 0.005 in. window to ensure proper embossing without crazing the disc. The height of the characters (or etch depth) plays a similar role in the marking (embossing) procedure. Preferably, the height of the characters (etch depth) should be 0.007 in. to 0.009 in.

Figure 3:
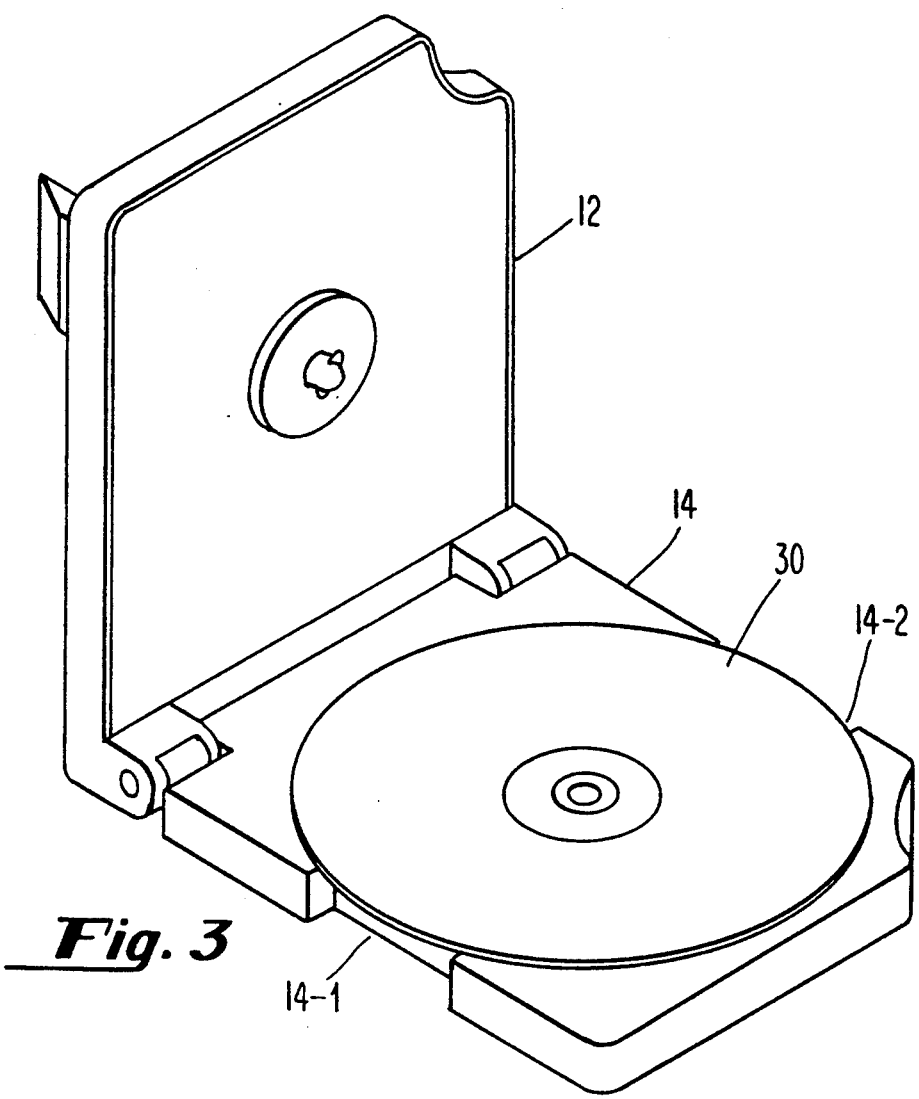
FIG. 3 depicts the marking apparatus holding a compact disc to be marked.

FIG. 3 shows the marking apparatus holding a compact disc to be marked. This figure clearly shows how the recesses 14-1, 14-2 in the bottom portion 14 make it easier for the user to grasp the disc 30 when removing it from the apparatus.

Figure 4:
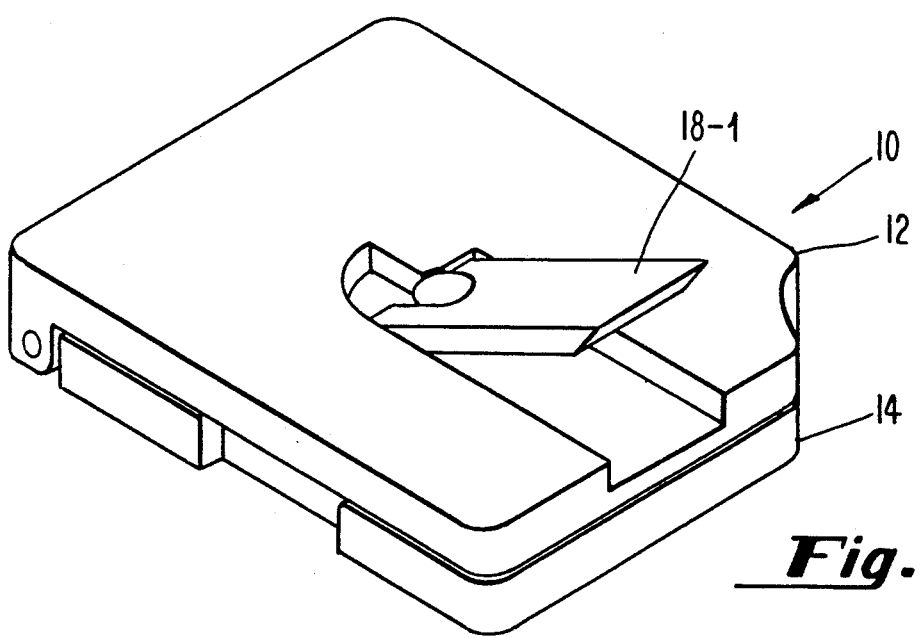
FIG. 4 depicts the marking apparatus in the process of marking the disc.

FIG. 4 shows the operation of closing the marking apparatus 10 such that the top portion 12 is pressed against the bottom portion 14 with the locking handle 18 engaged as described below. In addition, the lever member 18-1 is shown in a partially lowered position. This figure therefore depicts the apparatus in the process of applying the identifying markings to the disc.

Figure 5:
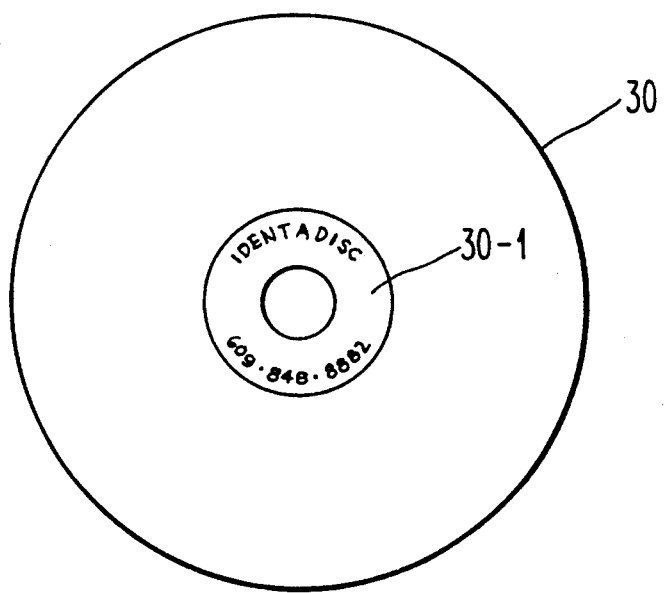
FIG. 5 depicts the compact disc after receiving identifying markings.

FIG. 5 depicts the compact disc 30 with the identifying markings formed in an area 30-1 that does not contain any information (e.g., music or data).

FIGS. 6–9 depicts in greater detail the locking mechanism whereby the top and bottom portions 12, 14 are locked together and the locking handle 18 compresses the compact disc 30 against the marking die 20 to form the identifying markings in the compact disc.

FIG. 6 depicts a cross-section through the apparatus with the top portion 12 not yet engaged with the bottom portion 14. As shown, the lever 18-1 is in its raised position, rotated upwards about the pivot 18-4. The engaging/compression member 18-2 has a flanged portion 18-5 which holds it in place in the top portion 12. The flanged engaging member 18-3 is designed to pass through the through-hole 14-5 in the bottom portion 14 and engage the bottom portion in the recess 14-6 when the lever 18-1 is horizontally pivoted 90°. The compact disc 30 is shown in close relation to the marking die 20.

Figure 7:
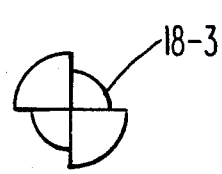
FIG. 7 depicts a view of the flanged engaging member 18-3 as viewed from the line 7—7 of FIG. 6.

The flanged engaging member 18-3 is notched as shown in FIG. 7 such that it will pass through the through-hole 14-6 and then grab the bottom member 14 when the lever 18-1 is rotated 90°. FIG. 8 shows the configuration of the bottom portion 14, through-hole 14-5, recess 14-6, and flanged engaging member 18-3 when the apparatus is prepared for compressing the die 20 against the compact disc 30.

FIG. 9 depicts a cross-section of the apparatus in a closed condition just prior to lowering the lever member 18-1 to apply identifying markings to the disc. The lever member 18-1 has been horizontally pivoted 90° relative to its position in FIG. 6.

Figure 10:
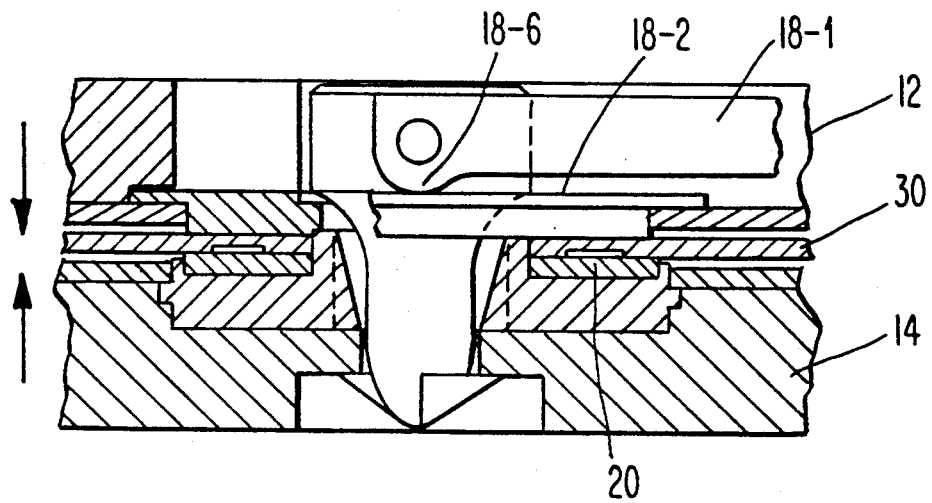
FIG. 10 is a view similar to FIG. 9 but with the locking handle 18 vertically pivoted to compress the disc against the die.

FIG. 10 depicts the apparatus with the lever member in its lowered position, with the rounded portion 18-6 exerting a downward force on the engaging/compression member 18-2 while simultaneously the flanged engaging member 18-3 pulls the bottom portion 14 and therefore the marking die 20 toward the top portion 12, thereby compressing the compact disc 30 against the die 20. As described above, the present inventor has found that a force of approximately 350 lbs. is required to impress the raised markings on the marking die 20 into the compact disc 30.

Although one specific embodiment of the present invention is described herein, the scope of protection of the following claims is not intended to be limited to that embodiment. For example, the following modifications of the preferred embodiment described herein are intended to be within the scope of protection of the claims:

1. A belview washer could be placed below the die. The die would move on the washer, making the unit self adjusting. This modification would also make the apparatus easier to mass produce.

2. A motorized unit employing, for example, a dot matrix printer head and a means for rotating the disc with the print head stationary. A computer could be used to control the unit.

3. A unit comprising means for polishing the disc.

What is claimed is:

1. A compact disc marking apparatus, comprising:
   (a) a top portion;
   (b) a bottom portion comprising a top surface for receiving a compact disc, a die receiving recess formed in said top surface for receiving a die bearing identifying marks, a through-hole coaxially aligned with said die receiving recess, a bottom surface opposite said top surface, and a recess formed in said bottom surface coaxially aligned with said through-hole;
   (c) a pivot coupling said bottom portion to said top portion; and
   (d) a locking handle coupled to said top portion so as to be movable to and from a position in axial alignment with said through-hole when said apparatus is in a closed condition, said locking handle comprising a lever member and an engaging/compression means for engaging said bottom portion and applying a compression force to compress the disc against a die in said die receiving recess to cause the identifying marks to be formed in the compact disc.

2. The compact disc marking apparatus recited in claim 1, wherein said engaging/compression means comprises a flanged engaging member and said locking handle further comprises means for horizontally-pivotally attaching the locking handle to said top portion permitting rotation about a vertical axis such that said flanged engaging member engages said recess formed in said bottom surface when said locking handle is rotated to a locked position and disengages said recess formed in said bottom surface when said locking handle is rotated to an unlocked position.

3. The compact disc marking apparatus recited in claim 2, wherein said locked and unlocked positions of said locking handle are approximately 90° apart.

4. The compact disc marking apparatus recited in claim 2, wherein said lever member comprises a partially rounded end vertically-pivotally coupled to said engaging/compression means permitting rotation about a horizontal axis such that the compression force is provided to compress the disc against a die when said lever member is in a lowered position and the compression force is removed when said lever member is in a raised position.

5. The compact disc marking apparatus recited in claim 4, wherein said locked and unlocked positions of said locking handle are approximately 90° apart; and wherein said bottom portion comprises first and second recesses formed on opposite sides of said bottom portion, whereby a user may grasp the compact disc at said recesses to seat and unseat the compact disc.

6. The compact disc marking apparatus recited in claim 1, wherein said lever member comprises a partially rounded end vertically-pivotally coupled to said engaging/compression means permitting rotation about a horizontal axis such that the compression force is provided to compress the disc against a die when said lever member is in a lower position and the compression force is removed when said lever member is in a raised position.

7. The compact disc marking apparatus recited in claim 1, wherein said bottom portion comprises first and second recesses formed on opposite sides of said bottom portion, whereby a user may grasp the compact disc at said recess to seat and unseat the compact disc.

8. A compact disc marking apparatus, comprising:
   (a) a top portion;
   (b) a die bearing identifying marks or raised characters, wherein the characters have a stroke width of approximately 0.003 in. to 0.005 in. and a height of approximately 0.007 in. to 0.009 in.;
   (c) a bottom portion pivotally coupled to said top portion, comprising a top surface for receiving a compact disc, a die receiving recess formed in said top surface for receiving said die, a through-hole coaxially aligned with said die receiving recess, a bottom surface opposite said top surface, and a recess formed in said bottom surface coaxially aligned with said through-hole; and
   (d) a locking handle coupled to said top portion so as to be movable to and from a position in axial alignment with said through-hole when said apparatus is in a closed condition, said locking handle comprising a lever member and an engaging/compression means for engaging said bottom portion and applying a compression force to compress the disc against the die in said die receiving recess to cause the identifying marks to be formed in the compact disc.

9. The compact disc marking apparatus recited in claim 8, wherein said engaging/compression means comprises a flanged engaging member and said locking handle further comprises means for horizontally-pivotally attaching the locking handle to said top portion permitting rotation about a vertical axis such that said flanged engaging member engages said recess formed in said bottom surface when said locking handle is rotated to a locked position and disengages said recess formed in said bottom surface when said locking handle is rotated to an unlocked position.

10. The compact disc marking apparatus recited in claim 9, wherein said locked and unlocked positions of said locking handle are approximately 90° apart.

11. The compact disc marking apparatus recited in claim 9, wherein said locked and unlocked positions of said locking handle are approximately 90° apart; and wherein said bottom portion comprises first and second recesses formed on opposite sides of said bottom portion, whereby a user may grasp the compact disc at said recesses to seat and unseat the compact disc.

12. The compact disc marking apparatus recited in claim 11, wherein said lever member comprises a partially rounded end vertically-pivotally coupled to said engaging/compression means permitting rotation about a horizontal axis such that the compression force is provided to compress the disc against the die when said lever member is in a lowered position and the compression force is removed when said lever member is in a raised position.

13. The compact disc marking apparatus recited in claim 8, wherein said lever member comprises a partially rounded end vertically-pivotally coupled to said engaging/compression means permitting rotation about a horizontal axis such that the compression force is provided to compress the disc against the die when said lever member is in a lowered position and the compression force is removed when said lever member is in a raised position.

14. The compact disc marking apparatus recited in claim 8, wherein said bottom portion comprises first and second recesses formed on opposite sides of said bottom portion, whereby a user may grasp the compact disc at said recess to seat and unseat the compact disc.

\* \* \* \* \*